US012651834B2

(12) United States Patent
Lee et al.

(10) Patent No.: US 12,651,834 B2
(45) Date of Patent: Jun. 9, 2026

(54) QUASI-N-BIT-QUANTIZED RECONFIGURABLE METASURFACE ANTENNA

(71) Applicant: Hongik University Industry-Academia Cooperation Foundation, Seoul (KR)

(72) Inventors: Jeonghae Lee, Seoul (KR); Yonghyun Nam, Seoul (KR)

(73) Assignee: Hongik University Industry-Academia Cooperation Foundation, Seoul (KR)

( * ) Notice: Subject to any disclaimer, the term of this patent is extended or adjusted under 35 U.S.C. 154(b) by 326 days.

(21) Appl. No.: 18/512,099

(22) Filed: Nov. 17, 2023

(65) Prior Publication Data

US 2024/0170841 A1 May 23, 2024

(30) Foreign Application Priority Data

Nov. 18, 2022 (KR) ........................ 10-2022-0155048

(51) Int. Cl.
*H01Q 3/46* (2006.01)
*H01Q 3/26* (2006.01)
(Continued)

(52) U.S. Cl.
CPC ................. *H01Q 3/46* (2013.01); *H01Q 3/26* (2013.01); *H01Q 3/34* (2013.01); *H01Q 9/0464* (2013.01)

(58) Field of Classification Search
None
See application file for complete search history.

(56) References Cited

U.S. PATENT DOCUMENTS

2021/0175931 A1* 6/2021 Choi ........................ H02J 50/80

FOREIGN PATENT DOCUMENTS

KR 10-2374152 B1 3/2022
KR 10-2422763 B1 7/2022
WO WO-2022081092 A1 * 4/2022 ............. H01Q 21/06

OTHER PUBLICATIONS

Y.-H. Nam, S.-G. Lee and J.-H. Lee, "A Novel Design Method for High-Efficiency Quasi-2-bit Reconfigurable Metasurface Antennas," in IEEE Transactions on Antennas and Propagation, vol. 72, No. 5, pp. 4653-4657, May 2024, doi: 10.1109/TAP.2024.3383224. (Year: 2024).*

(Continued)

*Primary Examiner* — Vladimir Magloire
*Assistant Examiner* — Ashley Brown Raynal
(74) *Attorney, Agent, or Firm* — Revolution IP, PLLC

(57) ABSTRACT

A quasi-N-bit-quantized reconfigurable metasurface antenna includes $2^{N-1}$ types of first to $2^{N-1}$ unit cells configured to operate in different phases, wherein the first to $2^{N-1}$ unit cells are each designed to operate in any one phase of two quantized phases according to an electrical control and are each quantized to 1 bit, the first to $2^{N-1}$ unit cells are combined and arranged in a lattice form, performs beam steering of maximum N bits corresponding to quantization efficiency of maximum 100% in at least one set target direction, and performs beam steering of a 1-bit level in the other directions. According to the present disclosure, a metasurface with a total of $2^N$ quantized phases may be implemented by combining and arranging $2^{N-1}$ types of 1-bit metasurface unit cells with two phases according to the state of a switching element.

13 Claims, 5 Drawing Sheets

(51) Int. Cl.
*H01Q 3/34* (2006.01)
*H01Q 9/04* (2006.01)

(56) References Cited

OTHER PUBLICATIONS

P. Li et al., "Dual-Polarization 1-bit/Quasi-2-bit Low-Cost Programmable Metasurface With Merged Control Circuit," in IEEE Transactions on Antennas and Propagation, vol. 72, No. 4, pp. 3348-3361, Apr. 2024, doi: 10.1109/TAP.2024.3368230. (Year: 2024).*

* cited by examiner

QUASI-N-BIT-QUANTIZED RECONFIGURABLE METASURFACE ANTENNA

CROSS-REFERENCE TO RELATED APPLICATION

This application is based on and claims priority under 35 U.S.C. § 119 to Korean Patent Application No. 10-2022-0155048, filed on Nov. 18, 2022, in the Korean Intellectual Property Office, the disclosure of which is incorporated by reference herein in its entirety.

BACKGROUND

The present disclosure relates to a quasi-N-bit-quantized reconfigurable metasurface antenna, and particularly, to a quasi-N-bit-quantized reconfigurable metasurface antenna that may increase aperture efficiency compared to a case of using a 1-bit metasurface unit cell using two quantized phase values.

A reconfigurable metasurface antenna is a lightweight, low-cost, and high-directional antenna that replaces a phase shifter of a phase array antenna with a low-cost variable element. Here, a reconfigurable metasurface antenna includes a reflection type antenna, a transmission type antenna, a waveguide type antenna, and a leakage wave type antenna, or so on, and a variable element includes a PIN diode, a varactor diode, a liquid crystal LC) diode, and a radio frequency micro-electrical-mechanical system (RF MEMS).

Among variable elements, elements such as a PIN diode and an RF-MEMS may determine a conduction (on) state and a short-circuit (off) state according to a state of a bias voltage. Therefore, the reconfigurable metasurface antenna using the variable elements uses two quantized reflection phases of 0° and 180° under on/off control by switching elements.

However, when using 1-bit control (quantization efficiency of about 45%) that implements two phases with one type of unit cell, a problem occurs in which antenna radiation efficiency is reduced due to an increase in phase error due to phase quantization.

Quantization efficiency may be improved by further differentiating the phases into 4 phases (2 bits, quantization efficiency of about 80%), 8 phases (3 bits, quantization efficiency of about 95%), or so on by using one type of unit cell, but with an increase in the number of diodes, there is a disadvantage of being less practical due to an increase in complexity of a bias circuit and a controller and an increase in heat generation.

In this way, the known reconfigurable metasurface antenna may control beams by using a two-quantized phase control method (1-bit control) according to on/off states with one switching element, but there is a problem in that performance is reduced due to high quantization loss.

In addition, when using an N-bit control method (2 bits or more) that uses N switching elements in one unit cell to reduce quantization loss, there is a disadvantage that a complex control circuit is required and practicality is reduced due to a disadvantage, such as high loss and heat generation.

The technology behind the present disclosure is disclosed in Korean Patent No. 10-2422763 (published on Jul. 20, 2022).

SUMMARY

An object of the present disclosure is to provide a quasi-N-bit-quantized reconfigurable metasurface antenna that may implement an N-bit metasurface with $2^N$ quantized phases by mixing and arranging $2^{N-1}$ different 1-bit metasurface unit cells with two quantized phases according to an electrical control.

According to an aspect of the present disclosure, a quasi-N-bit-quantized reconfigurable metasurface antenna includes $2^{N-1}$ (N is a natural number of 2 or more) types of first to $2^{N-1}$ unit cells configured to operate in different phases, wherein the first to $2^{N-1}$ unit cells are each designed to operate in any one phase of two quantized phases according to an electrical control and are each quantized to 1 bit, the first to $2^{N-1}$ unit cells are combined and arranged in a lattice form, performs beam steering of maximum N bits corresponding to quantization efficiency of maximum 100% in at least one set target direction, and performs beam steering of a 1-bit level in the other directions.

Also, the first to $2^{N-1}$ unit cells may be optimally arranged by using an equation for quantization efficiency $\eta_q$ below to maximize beam steering performance in one or more preset directions, $$\eta_q = \frac{|AF(\theta, \phi)_{quantized}|^2}{|AF(\theta, \phi)_{continuous}|^2}$$

where, $AF(\theta,\phi)_{quantized}$ and $AF(\theta,\phi)_{continuous}$ are respectively a quantized array factor and a continuous array factor in $(\theta,\phi)$ directions, and $\eta_q$, which represents quantization efficiency, is an index including an error occurring in a quantization process and is proportional to an antenna gain including phase quantization.

Also, some of a plurality of i-th unit cells, which are i types of unit cells, may operate in an (2i−1)th phase, and the other i-th unit cells may operate in an 2i-th phase according to an electrical control, and $i=(1, \ldots, 2^{N-1})$.

Also, when N=2, i=(1,2) and includes a total of 2 types of unit cells, some of the first unit cells may operate in a first phase and the other first unit cells may operate in a second phase according to the electrical control, and some of the second unit cells may operate in a third phase and the other second unit cells may operate in a fourth phase according to the electrical control.

Also, the $2^{N-1}$ types of first to $2^{N-1}$ unit cells, which are quantized to 1 bit, may operate in $2^N$ types of different phases.

Also, the $2^N$ types of different phases may represent characteristics of a transmission coefficient phase or a reflection coefficient phase depending on design methods of an antenna and may be set to correspond to an angle requested by a user.

Also, each of the respective types of unit cells may have an upper surface on which a metal patch and a switching element are placed and a lower surface on which a ground surface is formed, and two phases may be implemented by using a principle in which the metal patch and the ground surface operate in a short-circuited state or an open state according to a state of the switching element.

Also, a target beam steering angle may be adjusted according to a combination of on/off states of switching elements included in the first unit cell to the $2^{N-1}$ unit cells.

Also, the metal patch may be designed as a two-dimensional planar structure.

Also, the switching element may be implemented by an element that is controllable to be conducted (on) and short-circuited (off) according to a state of a bias voltage.

Also, the switching element may be implemented by any one of a PIN diode, a varactor diode, an LC diode, and an RF MEMS.

Also, the reconfigurable metasurface antenna may be implemented by any one selected from among a reflection type antenna, a transmission type antenna, a waveguide type antenna, and a leakage wave type antenna according to a feed method.

Also, the feed method may be applied to a spatial feed antenna including any one of a horn antenna, a patch antenna, and a slot antenna.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
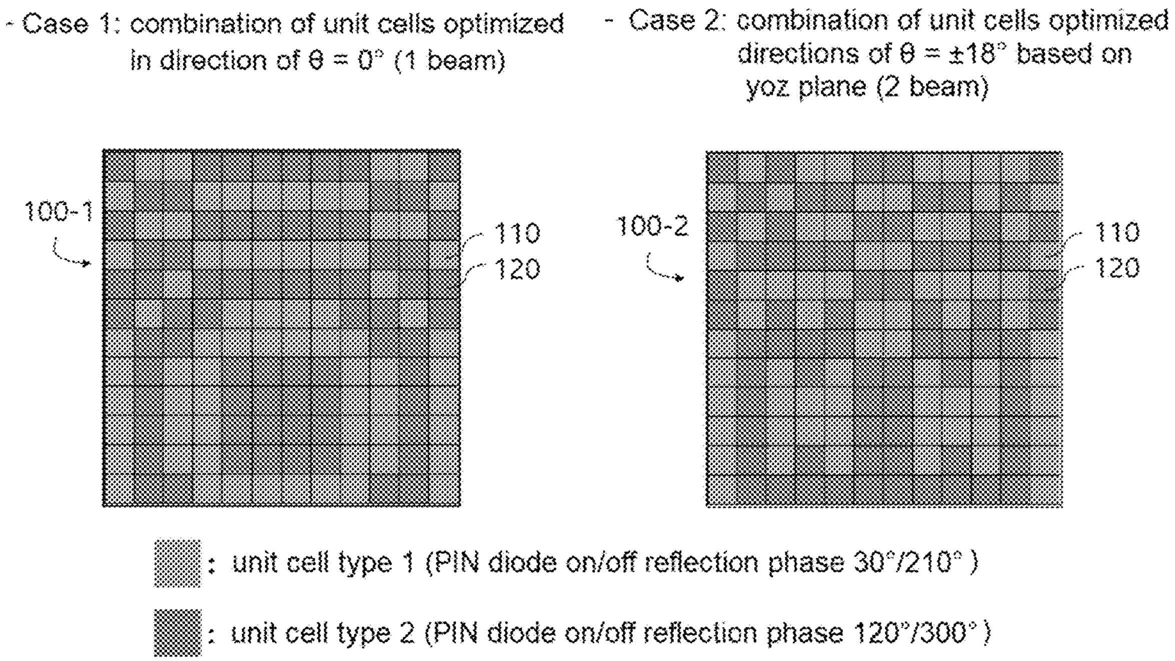
FIG. 1 illustrates diagrams of two examples of a reconfigurable metasurface antenna implemented by combining first and second unit cells, according to an embodiment of the present disclosure.

Then, embodiments of the present disclosure will be described in detail with reference to the accompanying drawings such that those skilled in the art to which the present disclosure belongs may easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the specification.

Throughout the specification, when a portion or a unit is described to be "connected" to another portion or another unit, this includes not only a case of being "directly connected", but also a case of being "electrically connected" with other elements therebetween. In addition, "including" a certain component means that other components may be further included, rather than excluding other components unless otherwise stated.

The present disclosure relates to a quasi-N-bit-quantized reconfigurable metasurface antenna and proposes a metasurface antenna structure with N-bit phases (total $2^N$ phases) by mixing and arranging $2^{N-1}$ different types of 1-bit metasurface unit cells which are controlled by one switching element.

Accordingly, the present disclosure may provide a reconfigurable metasurface antenna that has the same control circuit complexity as a conventional 1-bit reconfigurable metasurface while reducing a phase error due to quantization.

Specifically, a quasi-N-bit reconfigurable metasurface antenna according to an embodiment of the present disclosure may include $2^{N-1}$ (N is a natural number of 2 or more) types of first to $2^{N-1}$ unit cells configured to operate in different phases.

In this case, the first to $2^{N-1}$ unit cells may each be designed to operate in any one phase of two quantized phases according to an electrical control and are each quantized to 1 bit.

In addition, in the reconfigurable metasurface antenna according to the embodiment of the present disclosure, the first to $2^{N-1}$ unit cells may be combined and arranged in a lattice form, perform beam steering of maximum N bits corresponding to quantization efficiency of maximum 100% in at least one set target direction, and perform beam steering of a 1-bit level in the other directions.

When N=2, a reconfigurable metasurface antenna having a structure, in which first unit cells and second unit cells which are two types of unit cells operating at different phases are mixed and arranged, may be implemented. Each type of unit cell is designed to operate in one of two quantized phases according to an electrical control and is quantized to 1 bit. Accordingly, a metasurface antenna with phases (4 phases) of maximum 2 bits may be implemented.

That is, in the embodiment of the present disclosure, a reconfigurable metasurface antenna designed with N=2 may perform beam steering of maximum 2 bits corresponding to quantum efficiency of maximum 100% in a preset target direction and may perform beam steering of 1 bit level in the other directions.

In this way, the reconfigurable metasurface antenna designed with N=2 may have a structure in which two (=$2^{N-1}$) types of 1-bit metasurface unit cells (first unit cells and second unit cells) operating at different phases are mixed and arranged. Accordingly, a quasi-2-bit reflection-type reconfigurable metasurface antenna operating with 4 (=$2^N$) quantization phases may be implemented.

In addition, a reconfigurable metasurface antenna designed with N=3 may have a structure in which 4 (=$2^{N-1}$) types of 1-bit unit cells (first unit cells to fourth unit cells) operating at different phases are mixed and arranged. Accordingly, a quasi-3-bit reflection-type reconfigurable metasurface antenna operating with 8 (=$2^N$) quantization phases may be implemented.

Likewise, a reconfigurable metasurface antenna designed with N=4 has a structure in which 8 (=$2^{N-1}$) types of 1-bit unit cells (first unit cells to eighth unit cells) operating at different phases are mixed and arranged. Accordingly, a quasi-4-bit reflection-type reconfigurable metasurface antenna operating with a total of 16 (=$2^N$) quantization phases may be implemented.

Hereinafter, for the sake of convenience of description, a reconfigurable metasurface antenna designed with N=2 is used as a representative example.

FIG. 1 illustrates diagrams of two examples of a reconfigurable metasurface antenna implemented by combining first and second unit cells, according to an embodiment of the present disclosure.

FIG. 1 illustrates a structure in which a first unit cell 110 (type 1, reflection phase controllable at 30° and 210°) and a second unit cell 120 (type 2, reflection phase controllable at 120° and 300°) which are two types of 1-bit unit cells are optimally combined and arranged respectively for case 1 and case 2.

Here, case 1 illustrates a metasurface antenna 100-1 having an optimized arrangement targeting one direction of θ=0°, and case 2 illustrates a metasurface antenna 100-2 having an optimized arrangement targeting two directions of θ=±18° based on a yoz plane.

Even when beam steering is performed in directions other than a target direction, the two types of unit cells placed at respective positions may be fixed, and beam steering may be performed in the desired direction by changing a combination of on/off states of a PIN diode.

Referring to FIG. 1, a reconfigurable metasurface antenna 100 (100-1 and 100-2) according to an embodiment of the present disclosure includes a plurality of first unit cells 110 and a plurality of second unit cells 120. Also, the reconfigurable metasurface antenna 100 has a structure in which the plurality of first unit cells 110 and the plurality of second unit cells 120 are combined and arranged in a lattice form on the same plane. Here, the unit cell refers to a general metasurface unit cell.

The plurality of first unit cells 110 may be designed to operate in one of two quantized phases according to an electrical control and may be quantized into 1 bit. In this case, the electrical control may indicate controlling an on-off operation of the switching element included in the unit cell. The first unit cell 110 may implement two phases as one structure.

That is, a state of the switching element in the first unit cell 110 may be controlled to be on or off according to the electrical control, and by using this, some of the plurality of first unit cells 110 constituting the reconfigurable metasurface antenna 100 operate in a first phase, and the others may be set to operate in a second phase. For example, according to the electrical control, a switching element in the first unit cell (for example, a PIN diode) operates in the first phase (for example, 30°) when turned on, and operates in the second phase (for example, −150°) when turned off.

Likewise, the plurality of second unit cells 120 may be designed to operate in one of two quantized phases according to an electrical control and may be quantized to 1 bit. The second unit cell 120 may also be implemented in two phases as one structure.

That is, a state of a switching element in the second unit cell 120 may be controlled to be on or off according to an electrical control, and by using this, some of the plurality of second unit cells 120 constituting the reconfigurable metasurface antenna 100 operate in a third phase, and the others may be set to operate in a fourth phase. For example, according to an electrical control, the switching element in the second unit cell (for example, a PIN diode) operates in the third phase (for example, 120°) when turned on, and operates in the fourth phase (for example, −60°) when turned off.

As such, in the reconfigurable metasurface antenna 100, some of the plurality of first unit cells 110 are designed to operate in the first phase and the others are designed to operate in the second phase, and some of the plurality of second unit cells 120 are designed to operate in the third phase and the others are designed to operate in the fourth phase.

Also, the second unit cell 120 may have a specification different from a specification of the first unit cell 110. For example, the second unit cell 120 may have the same basic size as the first unit cell 110, but a size and shape of a metal patch formed in the second unit cell 120, a width and length of a metal wire formed in the second unit cell 120, and so on may be designed to have a different specification from the first unit cell 110.

Here, the first phase to the fourth phase represent a transmission coefficient phase or a reflection coefficient phase depending on antenna design methods, and may be randomly set in response to an angle requested by a user (designer).

The above-described embodiment provides a case of N=2, and an expanded concept for the case where N is greater than 2 is summarized as follows.

In the proposed reconfigurable metasurface antenna of the present disclosure, according to the electrical control of each type of unit cell, some of a plurality of i-th unit cells, which are the i-th type of unit cell, operate in a (2i−1)-th phase and the others operate in a 2i-th phase. In this case, there are $2^{N-1}$ types of unit cells, and i may be represented as i=(1, . . . , $2^{N-1}$).

Also, the proposed metasurface antenna may operate in $2^N$ different phases by $2^{N-1}$ types of unit cells quantized into 1 bit. In addition, the different $2^N$ phases may represent the properties of a transmission coefficient phase or a reflection coefficient phase depending on antenna design methods.

The metasurface concept using quasi-N bits ($2^N$ quantized phases) proposed by the present disclosure may be applied to various types of metasurfaces that use switching elements.

The reconfigurable metasurface antenna 100 may be implemented by any one of a reflection type antenna, a transmission type antenna, a waveguide type antenna, and a leakage wave type antenna according to a feed method. Here, the feed method may be applied to a spatial feed antenna including any one of a horn antenna, a patch antenna, and a slot antenna.

That is, the form of a metasurface that may be implemented may include a reflection type, a transmission type, a waveguide type, and a leakage wave type, and the unit cell may have different sizes, phases, and types.

In an embodiment of the present disclosure, a reflection-type reconfigurable metasurface is provided as an example, and the feed method uses a horn antenna (for example, a feed horn in FIG. 2) as an example.

The reconfigurable metasurface antenna 100 proposed in the embodiment of the present disclosure may be designed such that the plurality of first unit cells 110 and the plurality of second unit cells 120 are arranged in a lattice form to enable beam steering with quantization efficiency (maximum 2 bit level) of maximum 100% in at least one set target direction and to enable 1-bit level beam steering in the other directions.

In this case, 2-bit beam steering means that a phase may be adjusted to 4 states, and 1-bit beam steering means that the phase may be adjusted to 2 states. Here, in the reflection-type metasurface, the phase may indicate a reflection coefficient phase.

Therefore, in the embodiment of the present disclosure, the quasi-2-bit-quantized reconfigurable metasurface antenna (quasi-2-bit reconfigurable metasurface antenna) may indicate a reconfigurable metasurface antenna that implements four quantized phases by combining and arranging two different types of 1-bit unit cells. Here, a target beam steering angle may be adjusted by changing on-off combinations of switching elements included in the plurality of first unit cells 110 and the plurality of second unit cells 120.

In general, the quantization efficiency of a metasurface using phase quantization may be calculated by Equation 1 below.

$$\eta_q = \frac{|AF(\theta, \phi)_{quantized}|^2}{|AF(\theta, \phi)_{continuous}|^2} \quad \text{Equation 1}$$

Here, $AF(\theta,\phi)_{quantized}$ and $AF(\theta,\phi)_{continuous}$ are respectively a quantized array factor and a continuous array factor in $(\theta,\phi)$ directions, and $\eta_q$ represents quantization efficiency is an index including an error occurring in a quantization process and is proportional to an antenna gain including phase quantization.

When a continuous phase control may be made, quantization efficiency is 100%, and when quantization phase is used, the quantization efficiency may be calculated as about 45% for 1 bit and may be calculated as about 80% for 2 bits.

When a metasurface concept using quasi-N bits ($2^N$ quantization phases) proposed by the present disclosure is applied, it can be checked through Equation 1 that beam steering is made with the aperture efficiency of maximum N bit level in a target direction and with an aperture efficiency of more than 1 bit level in the other directions. Here, the target direction includes not only one direction but also multiple directions.

As such, the embodiment of the present disclosure proposes the reconfigurable metasurface antenna 100 having quasi-2 bits in which a continuous phase distribution is quantized into four quasi-values, and therethrough, aperture efficiency may be improved compared to using a single 1-bit unit cell with two quantized phase values.

The embodiment of the present disclosure may have a structure in which a metal patch (ring patch) and a switching element are placed on an upper surface of each of the first unit cell 110 and the second unit cell 120 and a ground surface is formed on a lower surface of each of the first unit cell 110 and the second unit cell 120, and two phases may be implemented by using a principle in which the metal patch and the ground surface operate in a short-circuited state or an open state according to on/off states of the switching element. A detailed structure of the unit cell may be checked through FIG. 3A to be described below.

The metal patch may be designed into a two-dimensional planar structure. In the embodiment of the present disclosure, the metal patch is exemplified in the form of a square ring patch, but the present disclosure is not limited thereto and may be designed into any structure that may be implemented in a two-dimensional planar form.

The switching element may be implemented by an element that is controllable to be conducted (on) and short-circuited (off) according to the state of a bias voltage and may be implemented by any one of, for example, a PIN diode, a varactor diode, a liquid crystal (LC) device, a radio frequency micro-electrical-mechanical system (RF MEMS). In the embodiment of the present disclosure, the PIN diode is used as a reconfigurable element in a representative example.

Among these, a PIN diode is used to verify the present disclosure and to implement a quasi-2-bit reflection-type reconfigurable metasurface that operates in $2^2$ quantization phases.

Figure 2:
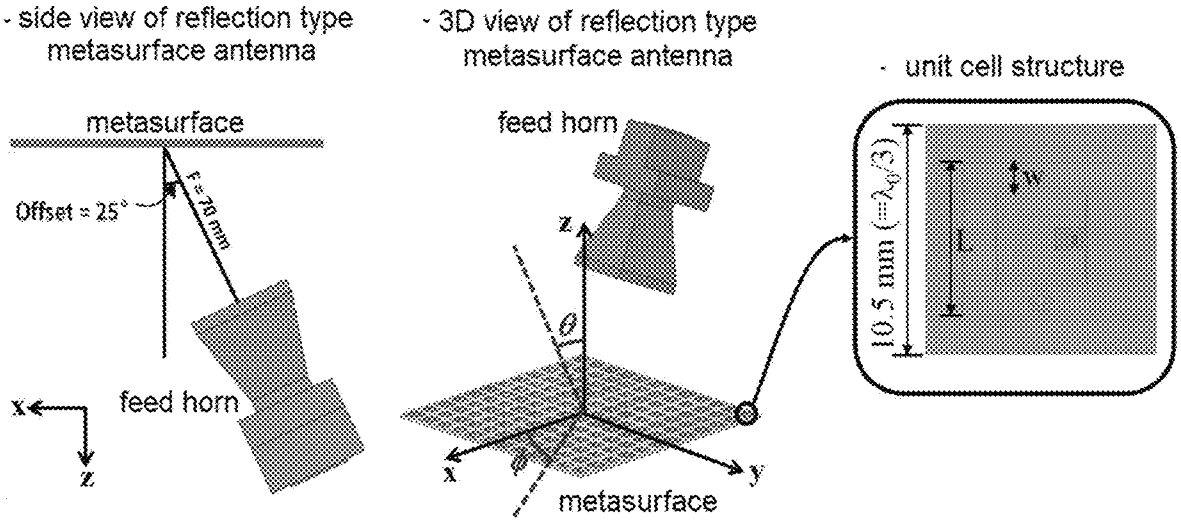
FIG. 2 illustrates views of a structure of a metasurface antenna according to an embodiment of the present disclosure.

FIG. 2 illustrates views of a structure of a metasurface antenna according to an embodiment of the present disclosure.

FIG. 2 illustrates the entire structure of a reflection-type reconfigurable metasurface antenna designed according to an embodiment of the present disclosure. The reconfigurable metasurface is implemented in a 12×12 array. As illustrated on the left of FIG. 2, in order to optimize an antenna gain, a distance F between a metasurface and a feed horn is set to 70 mm and an offset is set to 25°.

According to the present disclosure, two different types of unit cells, that is, the first unit cell 110 and the second unit cell 120, are arranged to obtain optimal efficiency in a target direction.

The ring-patch-type reconfigurable metasurface unit cells 110 and 120 are optimized for L and w and are designed based on 10.1 GHz, and the design result is shown in Table 1 below. Here, as illustrated in FIG. 2, L represents a length of a square ring patch, and w represents a line width of the square ring patch.

TABLE 1

| | | L [mm] | w [mm] | $\|\Gamma\|$ [dB] | $\angle\Gamma$ [°] |
|---|---|---|---|---|---|
| Unit cell type 1 | PIN on | 7.4 | 1.5 | −0.90 | 31.06 |
| (first unit cell) | PIN off | | | −0.10 | 218.78 |
| Unit cell type 2 | PIN on | 6.3 | 0.9 | −0.20 | 114.71 |
| (second unit cell) | PIN off | | | −0.43 | 302.22 |

Here, $|\Gamma|$ represents a reflection coefficient magnitude, and $\angle\Gamma$ represents a reflection coefficient phase.

As illustrated in Table 1, reflection coefficient magnitudes are −0.90, −0.10, −0.20, and −0.43 dB (reflection efficiency of average 91.3%), and reflection coefficient phases are 31.06° (≅30°), 218.78° (≅210°), 114.71° (≅120°), and 302.22° (≅300°).

In order to maximize quantization efficiency in the target direction, the two types of unit cells 110 and 120 are optimally arranged, and the optimal phase combination according thereto may follow Equation 2 below.

$$\varphi_1 - \frac{360° - \Delta\varphi_{1\text{-}bit}}{2} < \varphi_{(m,n)}^{continuous} < \varphi_1 + \frac{\Delta\varphi_{1\text{-}bit}}{2} \rightarrow \varphi_{(m,n)}^{continuous} \cong \varphi_{(m,n)}^{quantized} = \varphi_1, \quad \text{Equation 2}$$

$$\varphi_2 - \frac{\Delta\varphi_{1\text{-}bit}}{2} < \varphi_{(m,n)}^{continuous} < \varphi_2 + \frac{360° - \Delta\varphi_{1\text{-}bit}}{2} \rightarrow \varphi_{(m,n)}^{continuous} \cong \varphi_{(m,n)}^{quantized} = \varphi_2$$

Here, $$\varphi_{(m,n)}^{continuous} \text{ and } \varphi_{(m,n)}^{quantized}$$

are respectively a unit cell phase in a continuous case and a unit cell phase in a quantized case. A value $$\varphi_{(m,n)}^{quantized}$$

of is determined according to a range including $$\varphi_{(m,n)}^{continuous}, \text{ and } \varphi_{(m,n)}^{quantized}$$

is determined by two phases $\varphi_1$, $\varphi_2$ of a 1-bit unit cell and $\Delta\varphi_{1\text{-}bit}$ corresponding to a difference between the two phases of the 1-bit unit cell. $\Delta\varphi_{1\text{-}bit}$ is generally selected as a random value and selected as 180° in the embodiment of the present disclosure. Here, (m,n) represents an arrangement position (coordinates) of a unit cell.

Figure 3A:
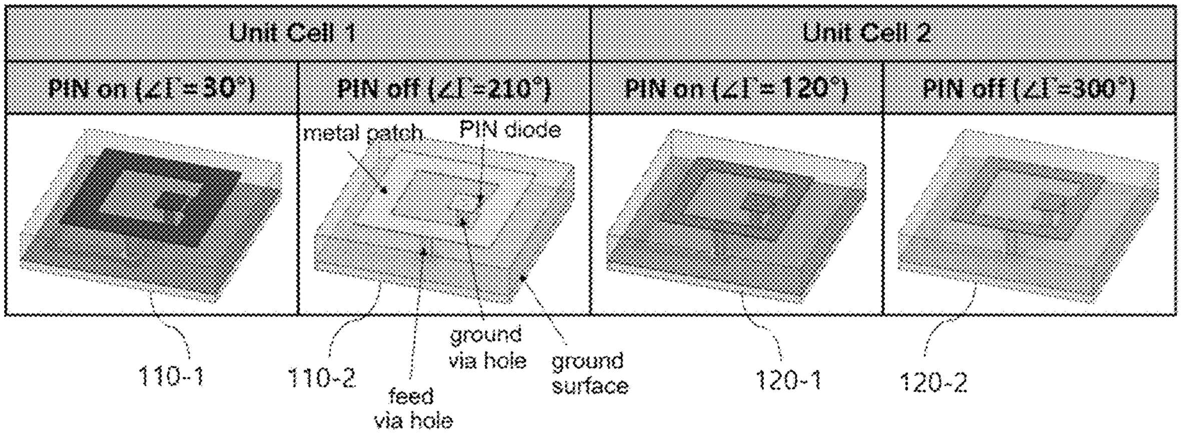
FIG. 3A illustrates views of examples of first and second unit cells which are different unit cells, according to an embodiment of the present disclosure.
Figure 3B:
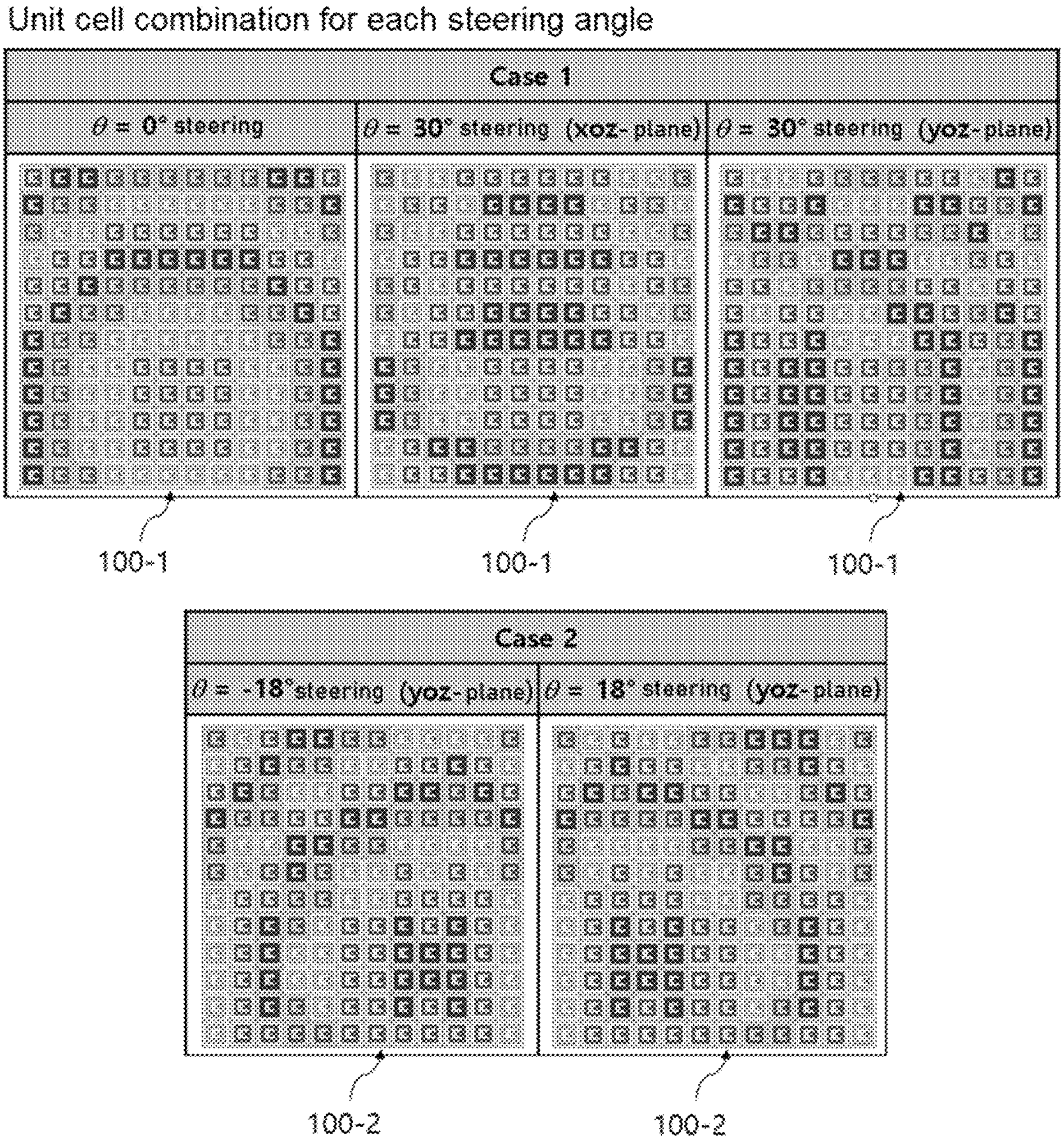
FIG. 3B illustrates views of beam steering in a set direction by changing an electrical control for two reconfigurable metasurface antennas obtained by differently combining the two unit cells of FIG. 3A.

FIG. 3A illustrates views of examples of first and second unit cells which are different unit cells, according to an embodiment of the present disclosure, and FIG. 3B illustrates views of beam steering in a set direction by changing an electrical control for two reconfigurable metasurface antennas obtained by differently combining the two unit cells of FIG. 3A. FIG. 3B illustrates a phase distribution for beam steering under condition of each case in FIG. 1.

In FIGS. 3A and 3B, 30° and 210°, which are 1-bit phases of the first unit cell 110, are illustrated as different brightness values, and 120° and 300°, which are 1-bit phases of the second unit cell 120, are illustrated as different brightness values.

The first unit cell (the first phase; 30°) having the PIN diode turned on is illustrated as 110-1, the first unit cell (the second phase; 210°) having the PIN diode turned off is illustrated as 110-2, the second unit cell (the first phase; 120°) having the PIN diode turned on is illustrated as 120-1, and the second unit cell (the second phase; 300°) having the PIN diode turned off is illustrated as 120-2.

The first unit cell 110 is implemented (1-bit-quantized) in two phases of 30° and 210° depending on the diode states, and the second unit cell 120 is implemented (1-bit-quantized) in two phases of 120° and 300° depending on the diode states. By combining and arranging different unit cells 110 and 120 quantized to 1 bit in this way, a total of four states of phases (30°, 210°, 120°, and 300°) are implemented and 2-bit beam steering is enabled.

FIG. 3B illustrates a phase distribution for beam steering in each of case 1 and case 2 of FIG. 1.

Case 1 shows three pieces of beam steering respectively in three directions (θ=0° steering, θ=30° steering (xoz-plane), and θ=30° steering (yoz-plane)), case 2 shows two pieces of beam steering respectively in two directions (θ=−18° steering (yoz-plane), and θ=18° steering (yoz-plane)).

Here, when beam steering is performed by using the reconfigurable metasurface antenna in case 1 of FIG. 1, a phase distribution is made in a direction of θ=0° and a direction of θ=30° based on the xoz and yoz planes. In this case, it can be seen that a beam steering angle changes as an on-off combination of a switching element of each unit cell is changed while maintaining a combination and arrangement of the unit cell of case 1.

In addition, when beam steering is performed by using the reconfigurable metasurface antenna in case 2 of FIG. 1, a phase distribution is made in a direction of θ=18° and a direction of θ=−18° based on the yoz plane. In this case, it can be seen that a beam steering angle changes as an on-off combination of a switching element of each unit cell is changed while maintaining a combination and arrangement of the unit cell of case 2.

In may be seen in FIG. 3B that a beam steering angle changes according to a combination of arrangement states of the plurality of first and second unit cells and an on-off state of each switching element included in each unit cell.

Figure 4:
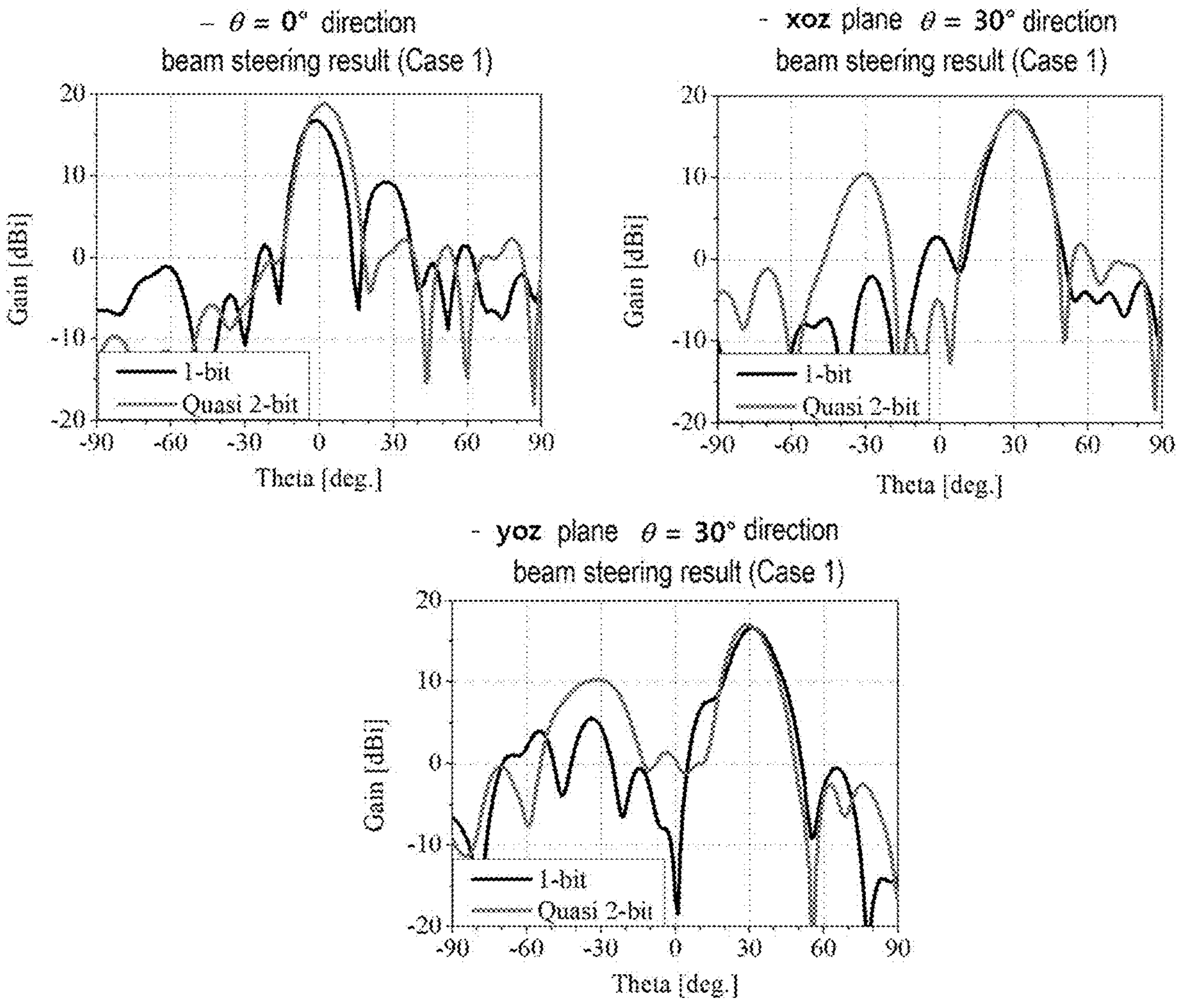
FIG. 4 illustrates graphs of radiation patterns when a beam is steered in a direction of θ=0° and a direction of θ=30° based on xoz and yoz planes by using a reconfigurable metasurface antenna in case 1 of FIG. 1.
Figure 5:
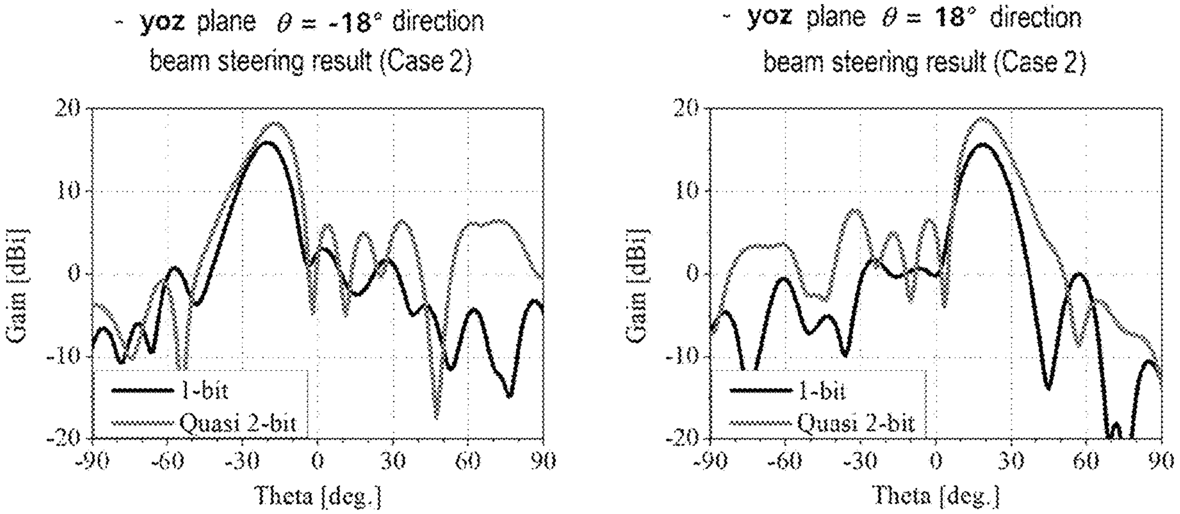
FIG. 5 illustrates graphs of a radiation pattern when a beam is steered in a direction of θ=±18° based on a yoz plane by using the reconfigurable metasurface antenna of case 2 of FIG. 1.

Table 2 shows a comparison of the calculated quantization efficiency, a simulated maximum gain, and aperture efficiency for the general 1-bit control and a quasi-2-bit control according to an embodiment of the present disclosure. The resulting radiation patterns are illustrated in FIGS. 4 and 5. Here, the aperture efficiency is obtained by Equation 3 below.

TABLE 2

| | | Quantization efficiency [%] | | Maximum gain [dBi] | | Aperture efficiency [%] | |
|---|---|---|---|---|---|---|---|
| Arrangement type | steering direction | 1-bit | Quasi 2-bit | 1-bit | Quasi 2-bit | 1-bit | Quasi 2-bit |
| Case 1 | θ = 0° | 47.47 | 83.11 | 16.72 | 18.80 | 20.19 | 33.55 |
| | θ = 30° (xoz plane) | 47.74 | 48.24 | 18.17 | 18.24 | 33.51 | 34.05 |
| | θ = 30° (yoz-plane) | 46.66 | 46.53 | 16.67 | 16.98 | 23.72 | 25.48 |
| Case 2 | θ = −18° (yoz-plane) | 44.72 | 68.00 | 15.95 | 18.22 | 18.52 | 30.86 |
| | θ = 18° (yoz-plane) | 44.72 | 69.92 | 15.67 | 18.72 | 17.26 | 34.63 |

$$\eta_a = \frac{G_{sim}}{G_{max}} = \frac{G_{sim}}{\frac{4\pi A}{\lambda^2}\cos\theta} \quad \text{Equation 3}$$

Here, aperture efficiency $\eta_a$ is calculated as a ratio of a maximum gain $G_{sim.}$ obtained from simulation of a reconfigurable metasurface antenna to a maximum gain $G_{max.}$ calculated in the same area A as the reconfigurable metasurface antenna. θ represents a steering angle at which the maximum gain is observed, and λ represents a wavelength of an electromagnetic wave that is used.

FIG. 4 illustrates graphs of radiation patterns when a beam is steered in a direction of θ=0° and a direction of θ=30° based on the xoz and yoz planes by using the reconfigurable metasurface antenna 100-1 of case 1 of FIG. 1.

FIG. 5 illustrates graphs of radiation patterns when a beam is steered in a direction of θ=±18° based on the yoz plane by using the reconfigurable metasurface antenna 100-2 of case 2 of FIG. 1.

In FIGS. 4 and 5, "1-bit" represents a result of beam steering at a corresponding angle by using the known reconfigurable metasurface antenna using only one type of unit cell quantized to 1 bit, and "quasi 2-bit" represents a result of beam steering at a corresponding angle by using a quasi-2-bit reconfigurable metasurface antenna according to an embodiment of the present disclosure, which is implemented by combining two different types of unit cells quantized to 1 bit.

As illustrated in FIG. 4, according to the result of case 1 (100-1) in which quasi 2 bits are used, it can be seen that the quantization efficiency at θ=0° targeting one direction is 83.11% and is similar to 1 bit in the other directions. It is possible to perform high-gain beam steering in which the aperture efficiency increases by 13.55% p compared to the known metasurface antenna (1-bit), and the aperture efficiency similar to the known metasurface antenna (1-bit) is observed in the other directions.

As illustrated in FIG. 5, in the results of case 2 (100-2), the quantization efficiency of the present disclosure is reduced compared to case 1 due to the limit of a phase controllable in one unit cell, but it can be seen that the quantization efficiency is significantly increased compared to the known metasurface antenna (1-bit). Accordingly, it can be seen that the aperture efficiency is increased by 12.34% p and 17.37% p respectively at θ=−18° and θ=18° targeting two directions in the yoz plane compared to the known metasurface antenna (1-bit).

From the results of FIGS. 4 and 5, in case 1 (100-1), beam steering may be performed in one target direction with greater efficiency than the known metasurface antenna (1-bit), and in case 2 (100-2), beam steering may be performed in both target directions with greater efficiency than the known metasurface antenna (1-bit).

In conclusion, the metasurface antenna (100; 100-1 and 100-2) according to an embodiment of the present disclosure may perform beam steering in at least one target direction with high efficiency (quantization efficiency: about 80%) of maximum 2 bits and may perform beam steering in the other directions with 1-bit level efficiency (quantization efficiency: about 45%).

In addition, the present disclosure uses a control circuit at the same level as a 1-bit reconfigurable metasurface antenna, and thus, a system may be simplified and lightweighted more than a 2-bit reconfigurable metasurface antenna, and there are advantages of less element loss and low heat generation because fewer switching elements are required compared to the 2-bit reconfigurable metasurface antenna.

As such, according to the embodiment of the present disclosure, a metasurface with a 2-bit phase (four quantized phases) may be implemented by combining and arranging two types of 1-bit metasurface unit cells with two phases according to the state of a switching element, and thus, it is possible to provide a reconfigurable metasurface antenna that has the same complexity of a control circuit as the known 1-bit reconfigurable metasurface while minimizing a phase error due to quantization.

The embodiment of the present disclosure provides quasi-2 bits, but by using more quantization phases, such as quasi-3 bits and quasi-4 bits, a high-gain metasurface antenna with higher quantization efficiency may be provided.

In other words, by applying the proposed technology of the present disclosure, a system may be expanded to multiple bits of 3 bits or more. Therefore, the reconfigurable metasurface antenna according to the embodiment of the present disclosure may be implemented to include at least three types of unit cells by adding at least one additional unit cell operating in another phase in addition to the two types of unit cells described above, thereby expanding and controlling to multiple bits.

As a result, according to the present disclosure, beam steering with a maximum quantization efficiency of 100% may be performed in a target direction, and beam steering of at least 1 bit or more level (quantization efficiency of about 45%) may be performed in the other directions.

In addition, a 1-bit phase control circuit is used to control the N-bit phases, and thus, there is an advantage of simplifying and lightweighting a system compared to the known N-bit phase control circuit.

In addition, the present disclosure has a disadvantage of reducing beam steering performance in directions other than the target direction, but only one switching element per unit cell is required, and thus, there are advantages of small element loss and low heat generation.

Therefore, the technology of the present disclosure may be suitable for applications in which high-gain beam steering may be performed in a predetermined direction and low-gain beam steering may be performed in the other directions.

According to the present disclosure, a metasurface with a total of $2^N$ quantized phases may be implemented by combining and arranging $2^{N-1}$ types of 1-bit metasurface unit cells with two phases according to the state of a switching element, and thus, it is possible to provide a reconfigurable metasurface antenna that has the same control circuit complexity as the known 1-bit reconfigurable metasurface while minimizing a phase error.

The present disclosure is described with reference to the embodiments illustrated in the drawings, but the embodiments are merely illustrative, and those skilled in the art to which the present disclosure belongs will understand that various modifications and equivalent other embodiments may be derived therefrom. Therefore, the true scope of technical protection of the present disclosure should be determined by the technical idea of the attached claims.

What is claimed is:

1. A quasi-N-bit-quantized reconfigurable metasurface antenna, comprising:

a metasurface including a plurality of unit cells arranged in a lattice array, wherein N is an integer of 2 or more, wherein the plurality of unit cells comprise $2^{N-1}$ different types of unit cells including a first type through a $2^{N-1}$th type, the different types having different phase responses with respect to an electromagnetic wave reflected from or transmitted through the metasurface, wherein each unit cell includes a switching element electrically controllable between at least a first state and a second state such that the unit cell is switchable between two quantized phase states, thereby providing 1-bit phase quantization at a unit-cell level, and wherein, by virtue of (i) the $2^{N-1}$ different types of unit cells and (ii) electrical control of the switching elements, the plurality of unit cells are collectively controllable to provide $2^N$ different phase states across the lattice array for beam steering in at least one preset target direction.

2. The quasi-N-bit-quantized reconfigurable metasurface antenna of claim 1, wherein the unit cells are arranged in the lattice array to maximize a quantization efficiency $\eta_q$ in one or more preset directions, $$\eta_q = \frac{|AF(\theta, \phi)_{quantized}|^2}{|AF(\theta, \phi)_{continuous}|^2}$$

where, $AF(\theta,\phi)_{quantized}$ is a quantized array factor in a direction (θ,ϕ) that is based on the $2^N$ different phase states, and $AF(\theta,\phi)_{continuous}$ is a corresponding continuous array factor in the direction (θ,ϕ).

3. The quasi-N-bit-quantized reconfigurable metasurface antenna of claim 1, wherein, for each integer i from 1 to $2^{N-1}$, the lattice array includes a plurality of unit cells of an i-th type, and the unit cells of the i-th type are electrically controllable such that some of the unit cells of the i-th type operate in a (2i−1)th phase state and remaining unit cells of the i-th type operate in a (2i)th phase state.

4. The quasi-N-bit-quantized reconfigurable metasurface antenna of claim 3, wherein N=2 such that the $2^{N-1}$ different types comprise a first ty pe and a second type and wherein:

unit cells of the first type are electrically controllable to operate in a first phase state or a second phase state; and unit cells of the second type are eclectically controllable to operate in a third phase state or a fourth phase state.

5. The quasi-N-bit-quantized reconfigurable metasurface antenna of claim 3, wherein the unit cells collectively provide $2^N$ different phase states.

6. The quasi-N-bit-quantized reconfigurable metasurface antenna of claim 5, wherein the $2^N$ different phase states represent a transmission coefficient phase or a reflection coefficient phase depending on design methods of the metasurface antenna.

7. The quasi-N-bit-quantized reconfigurable metasurface antenna of claim 3, wherein each unit cell includes:

an upper surface on which a metal patch is formed and a switching element is placed; and a lower surface on which a ground surface is formed, wherein the two quantized phase states are implemented based on the metal patch and the ground surface operating in a short-circuited state or an open state according to a state of the switching element.

8. The quasi-N-bit-quantized reconfigurable metasurface antenna of claim 7, wherein a target beam steering angle is adjusted according to a combination of on/off states of switching elements of the unit cells.

9. The quasi-N-bit-quantized reconfigurable metasurface antenna of claim 7, wherein the metal patch is designed as a two-dimensional planar structure.

10. The quasi-N-bit-quantized reconfigurable metasurface antenna of claim 9, wherein the switching element is implemented by an element that is controllable to be conducted (on) and short-circuited (off) according to a state of a bias voltage.

11. The quasi-N-bit-quantized reconfigurable metasurface antenna of claim 10, wherein the switching element is implemented by any one of a PIN diode, a varactor diode, a liquid crystal (LC) diode, and a radio frequency micro-electrical-mechanical system (RF MEMS).

12. The quasi-N-bit-quantized reconfigurable metasurface antenna of claim 1, wherein the reconfigurable metasurface antenna is implemented as any one selected from among a reflection type antenna, a transmission type antenna, a waveguide type antenna, and a leakage wave type antenna, according to a feed method.

13. The quasi-N-bit-quantized reconfigurable metasurface antenna of claim 12, wherein the feed method comprises spatially feeding the metasurface using a feed antenna including any one of a horn antenna, a patch antenna, and a slot antenna.

* * * * *